United States Patent [19]

Ermes

[11] 4,395,218
[45] Jul. 26, 1983

[54] MECHANICAL EXPANSION PLUG FOR THE INTERNAL CALIBRATION OF PLASTIC MATERIAL TUBES IN GENERAL, PARTICULARLY FOR FASHIONING THE SEATS FOR GASKETS

[75] Inventor: Neri Ermes, Bagnacavallo (RA), Italy

[73] Assignee: S.I.C.A. Serrande.Infissi.Carpenteria.Attrezzatura S.p.A., Alfonsine (RA), Italy

[21] Appl. No.: 314,222

[22] Filed: Oct. 23, 1981

[30] Foreign Application Priority Data

Nov. 14, 1980 [IT] Italy ................................. 3570 A/80

[51] Int. Cl.³ ............................................. B29C 17/00
[52] U.S. Cl. ................................... 425/392; 425/403; 425/DIG. 218
[58] Field of Search ...... 425/392, 393, 403, DIG. 218

[56] References Cited

U.S. PATENT DOCUMENTS 3,484,900 12/1969 Sands .................................. 425/393
3,677,684 7/1972 Platz .................................... 425/393

FOREIGN PATENT DOCUMENTS 804761 9/1973 Belgium .
353475 4/1979 Belgium .
2758188 1/1979 Fed. Rep. of Germany .
2610526 3/1979 Fed. Rep. of Germany .
2331404 10/1979 Fed. Rep. of Germany .
2940143 10/1979 Fed. Rep. of Germany .
603334 12/1975 Switzerland .

Primary Examiner—Thomas P. Pavelko
Attorney, Agent, or Firm—Darby & Darby

[57] ABSTRACT

Disclosed herein is a mechanical expansion plug for the internal calibration of plastic material tubes in general, particularly for fashioning the seats for gaskets, that comprises a tubular extending body provided, along the lateral surface thereof, with a circumferential aperture. Inside the said body, able to slide in the two directions coaxially thereto and without the possibility of one rotating with respect to the other, there is a movable element of truncated cone conformation, provided peripherally with a first and second set of equidistant guides that extend along generatrices of the said element and alternate one with the other. A first plurality of sectors, triangular when viewed in sectional form, bent externally to describe the maximum circumference of the seat to be fashioned in the tube, are coupled internally to the guides of the said first set, while a second plurality of sectors, trapezoidal when viewed in sectional form, bent externally to suit the said maximum circumference, alternate with the sectors of the said first plurality, coupled internally to the guides of the said second set.

5 Claims, 4 Drawing Figures

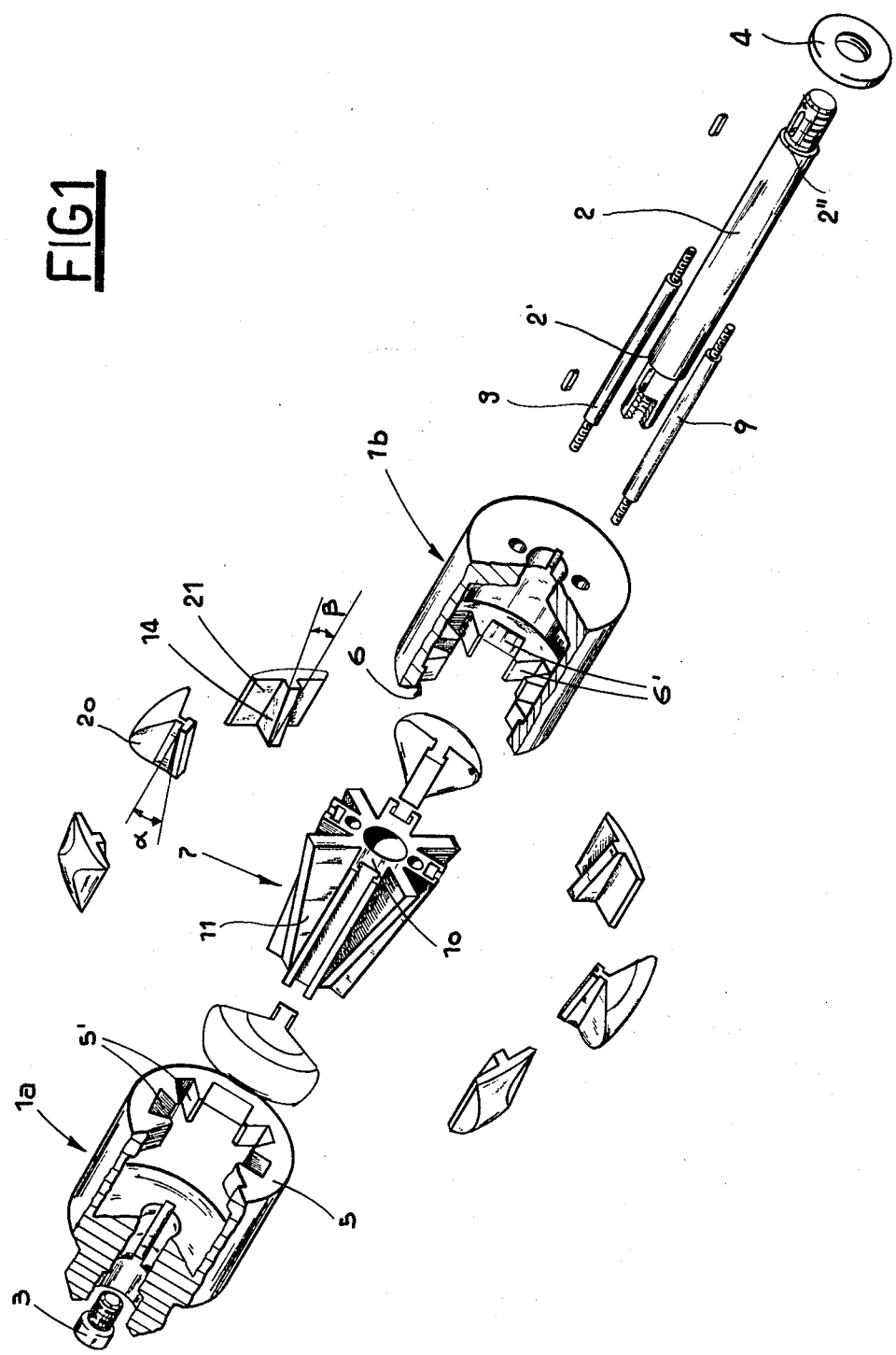

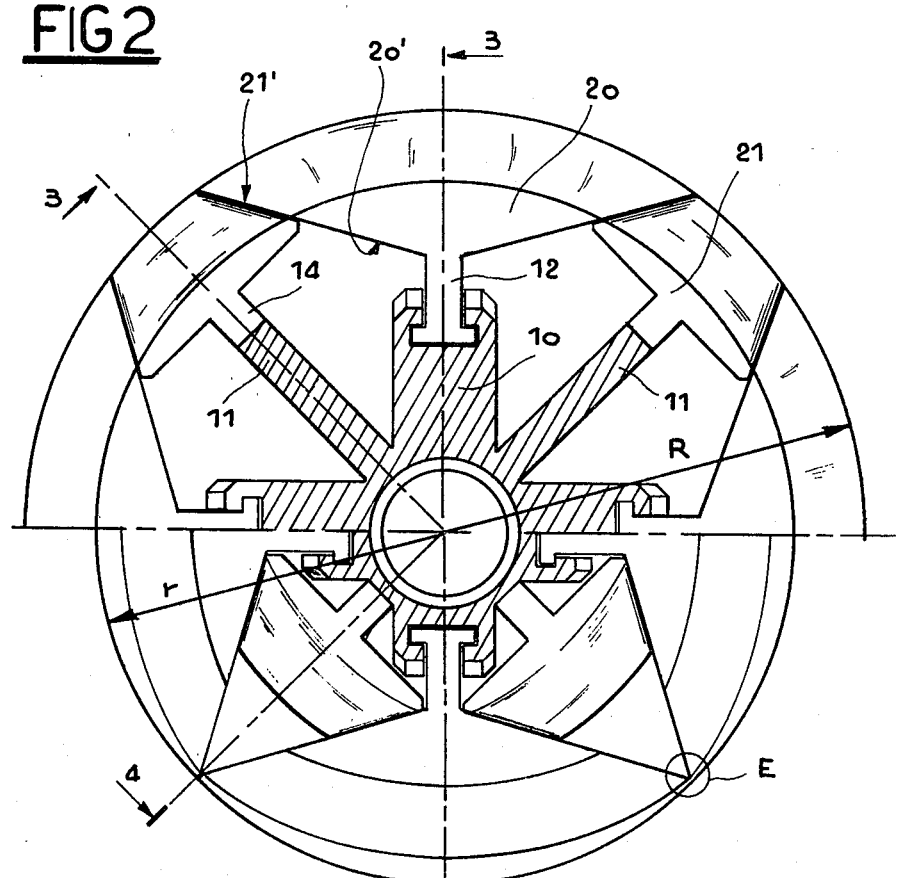
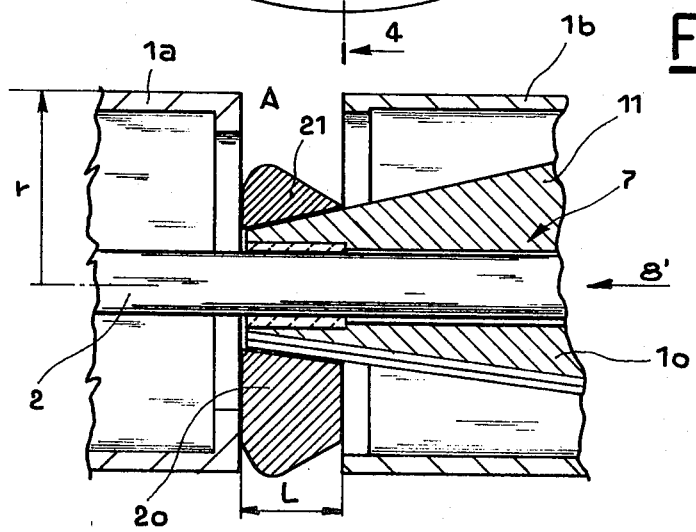

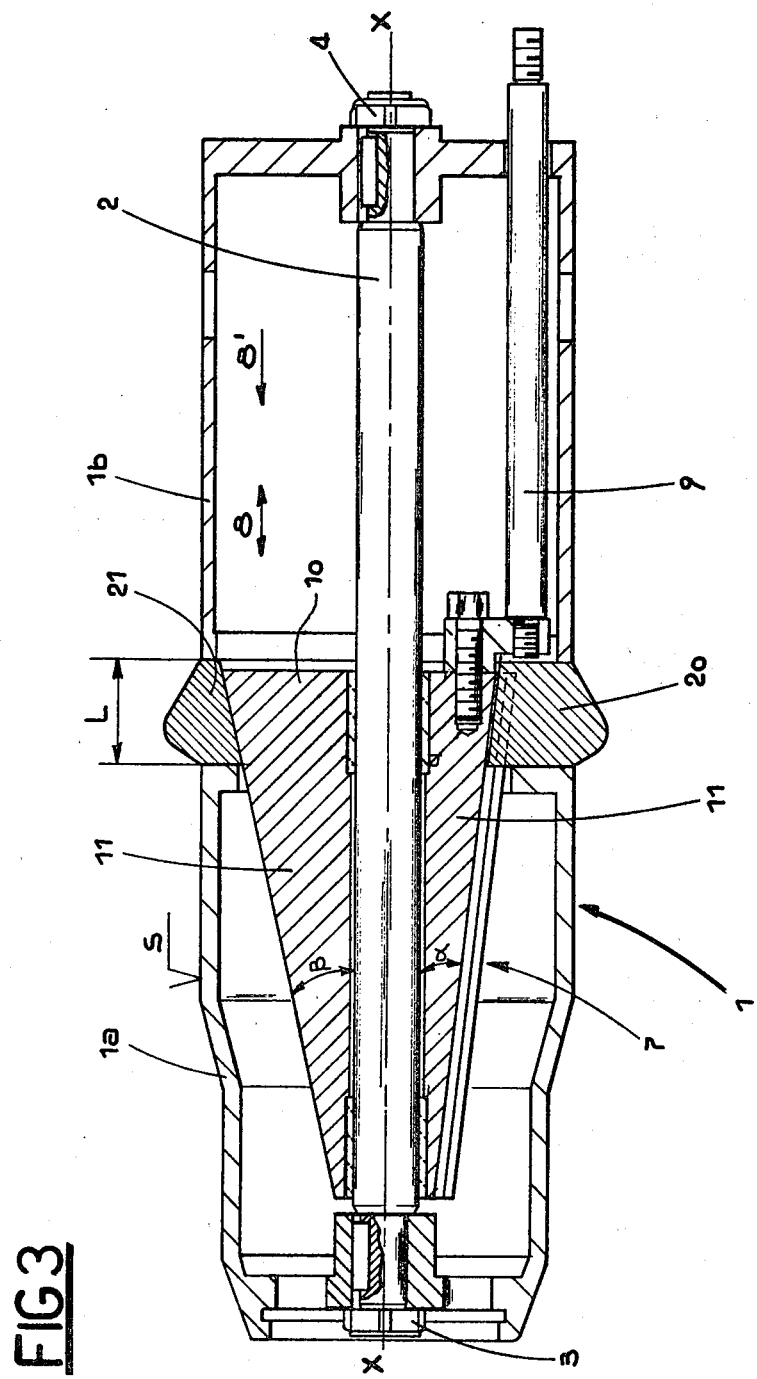

MECHANICAL EXPANSION PLUG FOR THE INTERNAL CALIBRATION OF PLASTIC MATERIAL TUBES IN GENERAL, PARTICULARLY FOR FASHIONING THE SEATS FOR GASKETS

BACKGROUND OF THE INVENTION

The invention relates to a mechanical expansion plug for the internal calibration of plastic material tubes in general, particularly for fashioning the seats for gaskets.

DESCRIPTION OF THE PRIOR ART

Various systems are used for the internal calibration of PVC and plastic material tubes in general, particularly for fashioning the seats for gaskets, and the best known of these comprises a tubular extending body whose outside dimensions correspond to the inside dimensions of the tube to be handled, provided with a ring of elastic material that is expansible circumferentially and reproduces externally the contour of the seat to be fashioned, the said ring being altered, through elastic deformation occasioned by a pressurized fluid, from an inactive conformation of non-projection from the outer surface of the said body, during the insertion into the tube and the extraction from the tube thereof, to an operative conformation of protrusion from the said lateral surface, during the fashioning of the said seat.

The said method, in itself efficient although with the reservations connected with the use of an elastic material that is liable to undergo deformation and to consequently wear out, and with a certain affinity between the material used for the ring and that of which the tube itself is made, is followed by a second method that utilizes, in addition to the usual tubular external body, as the seat forming element, a metal ring supported centrally by a shaft provided with a cam: the rotation of the said shaft causing, as a consequence, the ring to move away from the outer surface of the containment body and the maximum circumference appropriate to the seat required to be described "at certain points" instead of in its entirety.

With the said method, however, the difficulty exists of not constantly having a core inside the seat to be fashioned during the hardening time of the material constituting the tube and, as a consequence, this leads to the danger of the seat itself being of an irregular conformation due to the partial shrinkage of the plastic material.

SUMMARY OF THE INVENTION

The essential object of the invention is, therefore, to overcome the aforementioned problems and, in particular, to make available an expansion plug, made entirely of metal, with radially expansible elements that adopt, in the open position, a conformation identical to that of the seat to be fashioned, without any interruption between the various movable elements used to form the said plug.

A further object of the invention is to make available a mechanical plug, the opening and closing of which is controlled by one single operating device with which to ensure the correct movement of the component parts being rigorously maintained and the characteristics of the seats fashioned being consequently repeatable as time goes by.

Another object of the invention is to make available a plug that utilizes a number of sectors as component parts, these being movable contemporaneously, one sliding on the other, in such a way as to create a self-cleaning condition for them at the time of expansion, and wherein elastic return elements are not used for the relative movements: all this being achieved through a method that is extremely simple and inexpensive, above all in comparison with the results achievable therewith.

These and other objects too are all attained with the plug according to the invention, comprising a tubular extending body that can be inserted inside the tube to be machined and has has a circumferential aperture along its lateral surface, characterized by the fact that it comprises: a movable element of truncated cone conformation, supported and able to slide, in the two directions, inside the said body, coaxially thereto without the possibility of one rotating with respect to the other, under the action of operating means, the said element being provided, peripherally, at equal angular spacing one from the other, with a first and second set of guides that extend along generatrices of the said element, alternate, and slope with respect to the longitudinal sliding axis; a first plurality of sectors of circular conformation, movable radially inside the said circumferential aperture, virtually triangular when viewed along a radial section of the said body, bent externally to conform to the maximum circumference of the seat to be fashioned in the tube, and provided internally with a first tailpiece that can be coupled to a corresponding guide in the aforementioned first set; and a second plurality of sectors, also movable radially inside the said aperture, virtually trapezoidal when viewed along a radial section, bent externally to conform to the said maximum circumference, placed alternately with respect to the corresponding sectors of the said first plurality with their lateral sloping surfaces mating, and provided internally with a second tailpiece that can be coupled to the corresponding guides of the said second set, the latter having an inclination more pronounced than that of the guides of the said first set.

According to one preferred method, the said plug is characterized by the fact that the said second plurality of sectors merely rest on the corresponding second set of guides, while the coupling between the said first plurality of sectors and their corresponding guides is constituted by ordinary bilateral constraint.

BRIEF DESCRIPTION OF THE DRAWINGS

Further characteristics and advantages of the invention will become more apparent from the detailed description that follows of one preferred form of embodiment, illustrated purely as an unlimited example on the accompanying drawings, in which:

FIG. 1 shows the plug according to the invention, in an exploded view of the movable elements or sectors and of the containment body for these;

FIG. 2 shows the plug in question, seen along a radial section, with the sectors in their maximum expansion position (in the upper part of the figure) and in their maximum retraction position (in the lower part of the figure);

FIG. 3 shows the plug in question, seen along an axial longitudinal section 3—3 of FIG. 2, with the sectors in their maximum expansion position;

FIG. 4 shows the plug in question, seen along the section 4—4 of FIG. 2, with the sectors in their maximum retraction position.

DESCRIPTION OF THE PREFERRED EMBODIMENT

With reference to the above mentioned figures, the plug according to the invention is constituted by an external containment body 1, made in two separate tubular pieces 1a and 1b, respectively, whose external lateral surface S corresponds, once the plug has been assembled as shown in FIG. 3, to the inside surface of the tube to be handled. The said pieces are assembled coaxially one to the other through a shaft 2 and known locking means 3 and 4.

The shaft 2, through the abutment surfaces 2' and 2", causes the said pieces to be fixed together in such a way as to leave, between the facing surfaces 5 and 6 thereof, a circumferential aperture A of a width L, inside which are housed, as will be seen below, the movable sectors used to fashion the said seat in the tube. The said facing surfaces 5 and 6 serve, in this way, as planes for the containment and sliding of the said movable sectors.

The said body 1 has inside it an element 7 of truncated cone shape that is movable along the above mentioned shaft 2 (the latter acting as a guide), in the two directions shown at 8, under the action of operating means constituted by a pair of rods 9 that are integral with the said element 7 and project from the rear of the second piece 1b of the external body 1.

The said movable element 7 is provided externally with a first set of guides 10 and with a second set of guides 11, at equal angular spacing one from the other (there being a total of eight in the example), these alternating one with the other and extending along generatrices of the said element 7, inclined with respect to the longitudinal sliding axis x—x of the element 7 by an angle $\alpha$ in the case of the first set of guides 10, and by an angle $\beta$ in the case of the second set of guides 11.

To the said first set of guides 10 are coupled a first plurality of sectors 20, and to the said second set of guides 11, a second plurality of sectors 21, the former virtually triangular, bent externally to describe a circumference corresponding to the maximum value of the seat to be fashioned in the tube whose radius is shown at R in FIG. 2, and provided internally with a tailpiece 12 that terminates in a "T" and through ordinary bilateral constraint can be coupled to the underneath guide 10. The said second plurality of sectors 21, of isosceles trapezium conformation when viewed along the radial section in FIG. 2 are bent externally to suit the aforementioned maximum radium R, have internally a tailpiece 14 that merely rests on the underneath guide 11, and are maintained in the said position because of the lateral inclined surfaces 20' of the sectors 20 being in constant contact with the corresponding surfaces 21' of the sectors 21.

The tailpieces 12 and 14 of the aforementioned sectors also slope, with respect to the axis x—x, at an angle $\alpha$ and $\beta$, respectively, the width of the said sectors corresponding to the value L.

The operation of the plug in question is extremely simple. Let it be supposed that the said sectors 20 and 21 are in their maximum retraction position, as shown in FIG. 4, that is to say, that they are in the condition in which the body 1 is inserted into the tube to be machined, and that the movable element 7 is in its rearmost position. As can be seen from the lower part of FIG. 2, the sectors 21 are at their maximum retraction since they slide along the guides 11 and the inclined surfaces 20' of the complementary sectors 20, while the latter, when in their maximum retraction position, remain circumscribed by the radial circumference (r) of the pieces 1a and 1b of the body 1 in the region of the aperture A and, at the most, are able to come into contact with the lateral edges, as shown at E in FIG. 2.

At this point, namely with the body 1 inserted in the tube, the element 7 is made to move in the direction 8' and, correspondingly, the sectors 20, directed by the guides 10, start to expand radially and to carry with them, because of the aforementioned constant contact between the lateral inclined surfaces 20' and 21', also the remaining sectors 21 (which, moreover, are expanded radially under the action of the corresponding guides 11), until the maximum expansion configuration, shown in the upper part of FIG. 2, is attained, whereby the eight sectors 20 and 21 define globally a core that extends without any interruption (that is to say, without steps that would have an adverse effect on the quality of the machining of the seat fashioned) in the radius R.

As regards the dimensional values of the various elements, the angle of the lateral surfaces 20' and 21' has to be calculated to suit the maximum travel at the disposal of the sectors 21. Likewise, in order that the condition of constant contact between the said surfaces be maintained and, however, that the tailpiece 14 may be kept resting on the corresponding guide 11, it is necessary that there be a geometrical relationship between the angle values $\alpha$ and $\beta$.

Among the advantages the above outlined method has to offer, in addition to what has already been stated in respect of the quality of the machining, attention is drawn to the non presence of elastic means for the return movement of certain of the movable elements, the absence of variations in the length of the plug following the movements of opening and closing the sectors, and the perfect radial arrangement of the movements, as well as the self-cleaning condition created for the individual sectors during the expansion phase on account of their being in constant contact one with the other, as a consequence of which powder, deposits and accumulations of various kinds are driven outwards during the opening movement of the mechanical plug according to the invention.

This action is extremely important in lengthening the life-span of the plug, in decreasing wear and, furthermore, in preventing accidental inclusions in the movable elements of the plug which could cause it to be taken out of use after a few machining cycles.

According to the method outlined above, the pieces 1a and 1b of the containment body 1 are provided, in the region of the facing surfaces 5 and 6, with a number of housings 5' and 6' through which the guides 10 and 11 of the movable element 7 can pass freely.

By way of conclusion, it should be noted that the coupling between the tailpiece 12 and the corresponding guide 10 is effected with a certain amount of play so as to prevent the various moving parts from getting locked one to the other.

In its practical form of embodiment, the invention can also be in forms differing from the foregoing description and, in particular, numerous modifications of a practical nature may be introduced without, in any way, deviating from the framework of protection afforded to the invention as claimed below.

What is claimed is:

1. Mechanical expansion plug for the internal calibration of plastic material tubes in general, particularly for fashioning the seats for gaskets, comprising a tubular extending body that can be inserted inside the tube to be machined and has a circumferential aperture along its lateral surface, characterized by the fact that it comprises: a movable element of truncated cone conformation, supported and able to slide, in the two directions, inside the said body, coaxially thereto, without the possibility of one rotating with respect to the other, under the action of operating means, the said element being provided, peripherally, at equal angular spacing one from the other, with a first and second set of guides that extend along generatrices of the said element, alternate, and slope with respect to the longitudinal sliding axis; a first plurality of sectors of circular conformation, movable radially inside the said circumferential aperture, virtually triangular when viewed along a radial section of the said body, bent externally to conform to the maximum circumference of the seat to be fashioned in the tube, and provided internally with a first tailpiece that can be coupled to a corresponding guide in the aforementioned first set; and a second plurality of sectors, also movable radially inside the said aperture, virtually trapezoidal when viewed along a radial section, bent externally to conform to the said maximum circumference, placed alternately with respect to the corresponding sectors of the said first plurality with their lateral sloping surfaces mating, and provided internally with a second tailpiece that can be coupled to the corresponding guides of the said second set, the latter having an inclination more pronounced than that of the guides of the said first set, said first and second pluralities of sectors being movable between radially retracted and radially expanded positions and adopting, in the radially expanded position, a conformation identical to the internal conformation of the calibrated material.

2. Plug according to the preceding claim, wherein the said first plurality of sectors are coupled to the corresponding guides by ordinary bilateral constraint, and the said second plurality of sectors merely rest on the corresponding guides of the said second set.

3. Plug according to claim 1, wherein the sectors of the said first and second plurality have their lateral inclined surfaces in constant contact one with the other at the time of their radial movement.

4. Plug according to claim 1, wherein the said body is constituted by two tubular pieces, assembled coaxially one to the other through a shaft and so placed as to define centrally the said circumferential aperture, the said pieces being provided, in the region of the said aperture, with corresponding facing surfaces having a number of housings through which the guides of the movable element can pass freely.

5. Plug according to claims 1 or 2, wherein the coupling between the said first plurality of sectors and the corresponding guides is effected with a certain amount of play.

* * * * *